United States Patent [19]

Nishikawa et al.

[11] Patent Number: 4,603,604
[45] Date of Patent: Aug. 5, 1986

[54] CREEP-INHIBITING DEVICE FOR AN AUTOMOTIVE VEHICLE EQUIPPED WITH AN AUTOMATIC TRANSMISSION

[75] Inventors: Masao Nishikawa, Tokyo; Yoichi Sato, Wako; Yukihiro Fukuda, Asaka, all of Japan

[73] Assignee: Honda Giken Kogyo K.K., Tokyo, Japan

[21] Appl. No.: 698,401

[22] Filed: Feb. 5, 1985

[30] Foreign Application Priority Data

Feb. 9, 1984 [JP] Japan ................................. 59-22269
Mar. 16, 1984 [JP] Japan ................................. 59-50345

[51] Int. Cl.⁴ ........................................... F16H 47/00
[52] U.S. Cl. ...................................... 74/869; 74/865; 192/0.076
[58] Field of Search ................. 74/869, 868, 867, 866, 74/865; 192/109 F, 109 D, 0.075, 0.076

[56] References Cited

U.S. PATENT DOCUMENTS

| | | | |
|---|---|---|---|
| 4,313,353 | 2/1982 | Honig | 74/868 |
| 4,476,745 | 10/1984 | Moan | 74/868 X |
| 4,478,108 | 10/1984 | Nishimura et al. | 74/866 |
| 4,494,423 | 1/1985 | McCarthy et al. | 74/868 X |
| 4,513,638 | 4/1985 | Nishikawa et al. | 74/866 |
| 4,539,870 | 9/1985 | Sugano | 74/865 X |

Primary Examiner—Allan D. Herrmann
Assistant Examiner—Joseph M. Rolnicki
Attorney, Agent, or Firm—Arthur L. Lessler

[57] ABSTRACT

A creep-inhibiting device for use in an automotive vehicle equipped with an engine and a transmission mechanism coupled in series to a fluid coupling and having a frictionally engaging element. The device includes engine load sensor means for producing a signal fluid having a pressure representative of engine load, control means interposed between the frictionally engaging element and an operating fluid source, and a fluid line for delivering the signal fluid from the engine load sensor means to the control means. The control means is adapted to control the power transmission capacity of the frictionally engaging element within a range from substantially zero to a predetermined value in dependence on the signal fluid pressure supplied thereto, to inhibit creeping of the vehicle when the engine is in a no-load state. Selector valve means is arranged in the fluid line and adapted to assume a first position wherein it allows the signal fluid to flow in both directions from the engine load sensor means to the control means and vice versa when the pressure of the signal fluid is lower than a predetermined value, and to assume a second position wherein it allows the signal fluid to flow in a sole direction from the engine load sensor means to the control means when the pressure of the signal fluid is higher than the predetermined value.

7 Claims, 3 Drawing Figures

CREEP-INHIBITING DEVICE FOR AN AUTOMOTIVE VEHICLE EQUIPPED WITH AN AUTOMATIC TRANSMISSION

BACKGROUND OF THE INVENTION

This invention relates to a creep-inhibiting device for use in an automotive vehicle equipped with an automatic transmission, and more particularly to a device of this kind which can be rendered operative or inoperative without causing a shock to a frictionally engaging element of the clutch, and with required responsiveness depending on the stepping action of the accelerator pedal.

In an automotive vehicle equipped with an automatic transmission having a fluid coupling such as a torque converter, the phenomenon can occur that, due to dragging torque of the torque converter, the vehicle moves forward or creeps against the driver's will when the vehicle stands with the shift lever shifted to a drive range (forward) position, creating a load on the engine. Such load on the engine, if applied at engine idle, causes a drop in the rotational speed of the engine, even resulting in engine stall. To avoid this disadvantage, the driver has to step on the accelerator pedal by an amount corresponding to the drag torque so as to prevent a drop in the rotational speed of the engine at idle. However, this is not desirable from the viewpoint of fuel curtailment. Therefore, it is desired that when the engine is at idle, the transmission is automatically brought into a neutral state to interrupt power transmission between the engine and the driving wheels, so that the driver is not required to step on the accelerator pedal by a large amount, for economy of fuel consumption. It is known that a creep-inhibiting device manufactured for this purpose can also provide an advantage that vibrations of the vehicle body are reduced during idling operation of the engine, which is particularly effective when the device is applied to front wheel-driven vehicles.

Although creeping of the vehicle can be avoided by reducing the torque transmission capacity of a frictionally engaging element used for starting of the vehicle, i.e. a first-speed clutch, to substantially zero upon stoppage of the vehicle, the torque transmission capacity has to soon be recovered in response to the engine load, i.e. the stepping amount of the accelerator pedal, in order to start the vehicle. Particularly when the driver is required to move his vehicle in a narrow space, for instance, to park his vehicle in a space between vehicles parked in line with the street, it is desired to maintain the clutch in a slip-permitting state so that a desired small level of power transmission capacity may be obtained through the clutch, which is proportionate to a fine stepping amount of the accelerator pedal. On the other hand, when the vehicle is started with no other vehicle running ahead, it is required to shorten the slip-permitting period to a minimum possible value, so as to promptly establish complete engagement of the clutch. Otherwise the clutch becomes engaged only after the engine speed has risen to a high level, resulting in a discomfortable shock and early wear of the clutch.

In a vehicle equipped with a conventional creep-inhibiting device, if the accelerator pedal is stepped on and then immediately restored to the idle position, the creep-inhibiting device will be promptly operated so that the whole engine and transmission system is abruptly relieved of torque which has largely twisted mounting rubber members supporting same to suddenly release torsional energy from the mounting rubber members, etc., thus causing a discomfortable shock. To avoid this, the creep inhibiting function of the creep-inhibiting device has to be exhibited with a time delay by a short period of time until the engine speed is sufficiently decreased, even after the accelerator pedal has been released.

Further, as is known, to increase the internal pressure of the first-speed clutch in good response to the stepping-on of the accelerator pedal, desirably the pressure within the clutch should not be reduced to zero even while the creep-inhibiting device is operating, but should be controlled in advance to a value as close as possible to and at the same time smaller than a pressure value above which the clutch becomes engaged against the force of a return spring provided in the clutch, i.e. the engaging pressure Pe. However, if the pressure within the clutch is thus increased to such value close to the engaging pressure in advance, such increased pressure can act as a residual pressure at subsequent shifting of the shift lever to the neutral position or to the reverse position, thus degrading the responsiveness of the clutch to a gear shifting action by the driver, particularly in cold weather.

SUMMARY OF THE INVENTION

It is an object of the invention to provide a creep-inhibiting device for use in an automotive vehicle, which is simple in construction and is capable of controlling the power transmission capacity of a frictionally engaging element used for starting the vehicle, in exact response to a parameter representative of the engine load, such as the stepping amount of the accelerator pedal, to thereby avoid a discomfortable shock given by the frictionally engaging element upon sudden release of the accelerator pedal and promptly bring about a creep-permitting state when the accelerator pedal is suddenly stepped on.

It is another object of the invention to provide a creep-inhibiting device for use in an automotive vehicle equipped with an automatic transmission, which can provide the automatic transmission with high responsiveness to shifting of the shift lever by the driver to a neutral position or to a reverse position even in cold weather.

The invention provides a creep-inhibiting device for use in an automotive vehicle equipped with an engine, a fluid coupling, a transmission mechanism coupled in series to the fluid coupling and having a frictionally engaging element, and an operating fluid source for supplying an operating fluid to the frictionally engaging element. The creep-inhibiting device includes engine load sensor means for producing a signal fluid having a pressure representative of load applied on the engine, control means interposed between the frictionally engaging element and the operating fluid source, and a fluid line for delivering the signal fluid from the engine load sensor means to the control means, wherein the control means is adapted to control the power transmission capacity of the frictionally engaging element within a range from substantially zero to a predetermined value in dependence on the pressure of the signal fluid supplied thereto, to thereby inhibit creeping of the vehicle when the engine is in a no-load state. Selector valve means is arranged in the fluid line, and adapted to assume a first position wherein it allows the signal fluid to flow in both directions from the engine load sensor means to the control means and vice versa when the pressure of the signal fluid is lower than a predetermined value, and to assume a second position wherein it allows the signal fluid to flow in a sole direction from the engine load sensor means to the control means when the pressure of the signal fluid is higher than the predetermined value.

Preferably, the selector valve means includes retarding means for reducing the speed of a shifting motion thereof from the second position to the first position, which takes place when the pressure of the signal fluid decreases, to a value lower than the speed of a shifting motion thereof from the second position to the first position, which takes place when the pressure of the signal fluid increases.

The control means, in a preferred form, comprises an input fluid line connected to the operating fluid source, an output fluid line connected to the frictionally engaging element, a valve body disposed to selectively connect and disconnect the input fluid line to and from the output fluid line and having first and second end faces, a first pressure chamber defined in part by the first end face of the valve body and disposed to be supplied with an operating fluid pressure in the output fluid line, a second pressure chamber defined in part by the second end face of the valve body and disposed to be supplied with the pressure of the signal fluid, a third fluid line having a restriction and disposed to always deliver the operating fluid pressure in the output fluid line to the second pressure chamber, resilient means urging the valve body in a direction of connecting the input fluid line to the output fluid line, and a drain line disposed to escape the operating fluid pressure in the output fluid line to a zone under a lower pressure when the valve body is biased in a direction of disconnecting the input fluid line from the output fluid line due to a difference in fluid pressure between the first pressure chamber and the second pressure chamber, by an amount corresponding to the amount by which the valve body is biased.

Preferably, the creep-inhibiting device further includes a first one-way valve arranged in the first-mentioned fluid line extending between the control means and the selector valve means, and disposed to allow the fluid to flow in a sole direction from the selector valve means to the control means, and a second one-way valve arranged in the first-mentioned fluid line in parallel with the first one-way valve and disposed to allow the fluid to flow in a sole direction from the control means to the selector valve means, and wherein the second one-way valve is adapted to open when the pressure of fluid upstream thereof is higher than the pressure of fluid downstream thereof by an amount exceeding a predetermined value.

Also preferably, the vehicle has a braking device, and the second one-way valve comprises an electromagnetic valve. The creep-inhibiting device further includes brake sensor means for detecting whether or not the braking device is operative, and a driving circuit adapted to open the electromagnetic valve when the braking device is detected to be operative by the brake sensor means, whereby the power transmission capacity of the frictionally engaging element is set to different values in dependence on whether the braking device is operative or inoperative.

Still preferably, the control means further includes a bypass fluid line bypassing the control means and connecting the frictionally engaging element to the operating fluid source, and a one-way valve arranged in the bypass fluid line and disposed to allow the fluid to flow in a sole direction from the frictionally engaging element to the operating fluid source.

The above and other objects, features and advantages of the invention will be more apparent from the ensuing detailed description taken in conjunction with the accompanying drawings.

DETAILED DESCRIPTION

The invention will now be described in detail with reference to the drawings illustrating embodiments thereof.

Figure 1:
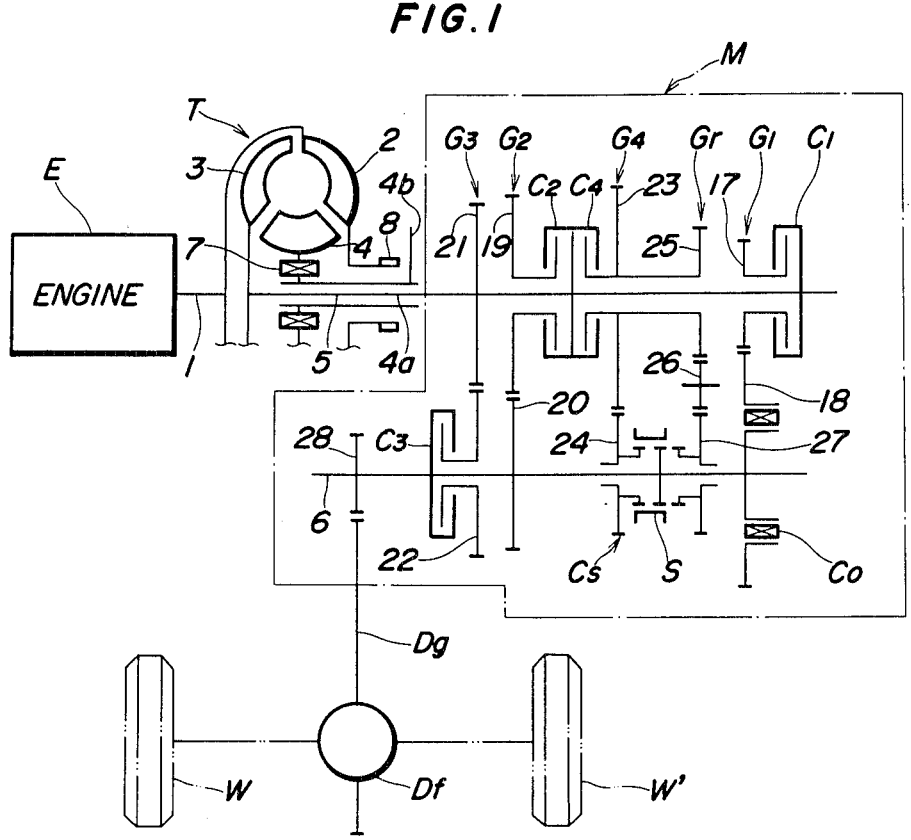
FIG. 1 is a schematic view of an automatic transmission for automotive vehicles, to which is applied a creep-inhibiting device according to the invention.

Referring first to FIG. 1, there is schematically illustrated an automatic transmission for automotive vehicles having four forward speed reduction gears and one reverse gear, to which the invention is applied. Output from an engine E is transmitted to driving wheels W and W' for driving same through a crankshaft 1 of the engine, a torque converter T as a fluid coupling, an auxiliary transmission M, and a differential Df in the mentioned order.

The torque converter T comprises a pump 2 coupled to the crankshaft 1, a turbine 3 coupled to an input shaft 5 of the auxiliary transmission M, and a stator 4 coupled, via a one-way clutch 7, to a stator shaft 4a which in turn is supported on the input shaft 5 for rotation relative thereto. Torque is transmitted from the crankshaft 1 to the pump 2, and then to the turbine 3 in a hydrodynamic manner. When amplification of torque takes place while torque is transmitted from the pump 2 to the turbine 3, the resulting reaction force is borne by the stator 4, as is already known.

Figure 2:
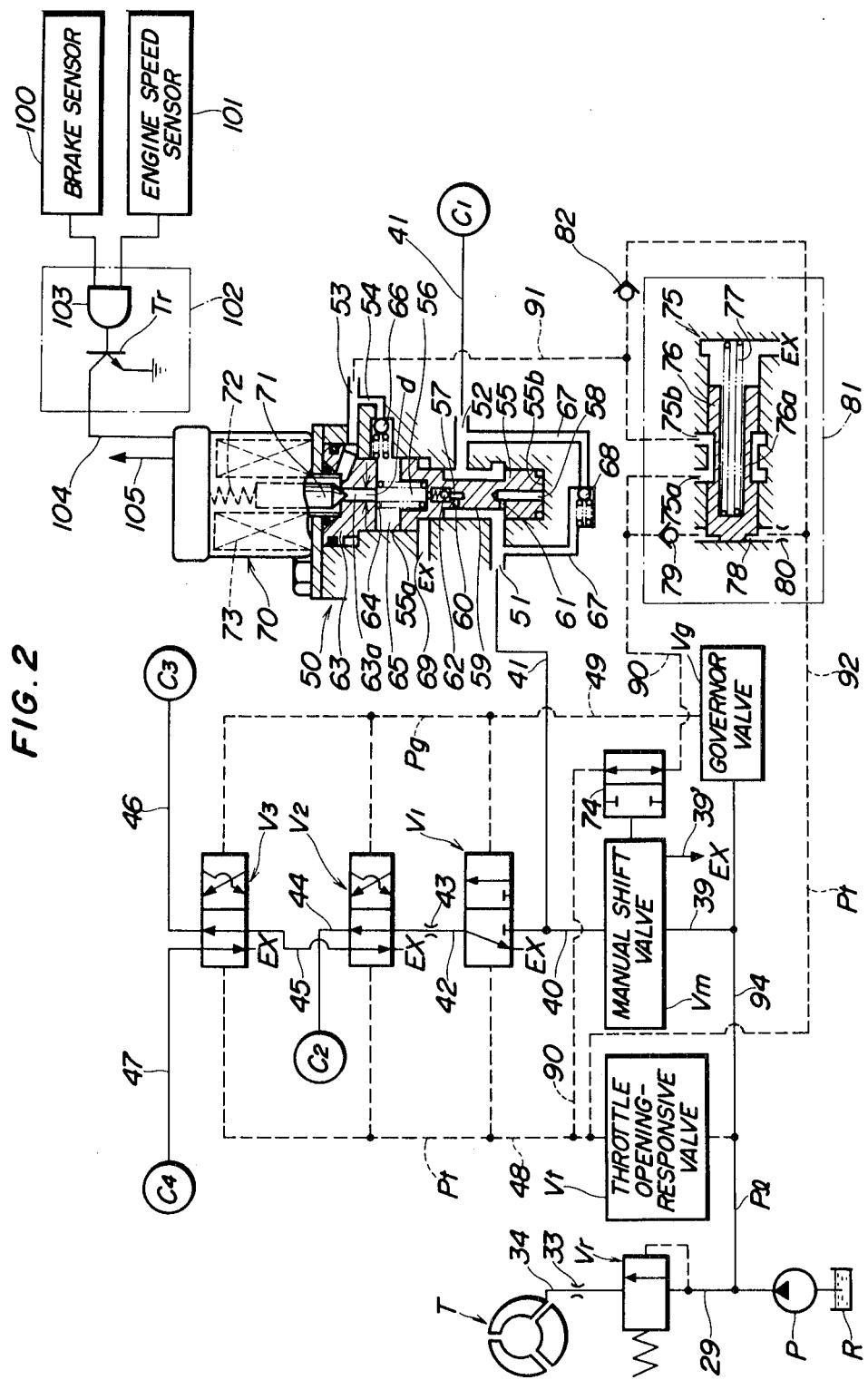
FIG. 2 is a circuit diagram illustrating a hydraulic control system employed in the automatic transmission of FIG. 1, in which is incorporated the creep-inhibiting device according to a first embodiment of the invention.

A pump driving gear 8 is arranged on a right end of the pump 2 as viewed in FIG. 1, for driving an oil hydraulic pump P appearing in FIG. 2. A stator arm 4b is secured to a right end of the stator shaft 4a for controlling a regulator valve Vr appearing in FIG. 2.

The auxiliary transmission M has an output shaft 6 extending parallel with the input shaft 5, and is provided with a first-speed gear train G1, a second-speed gear train G2, a third-speed gear train G3, a fourth-speed gear train G4, and a reverse gear train Gr, all arranged in juxtaposition between the input and output shafts 5, 6. The first-speed gear train G1 comprises a driving gear 17 connectible to the input shaft 5 through a first-speed clutch C1, and a driven gear 18 connectible to the output shaft 6 through a one-way clutch C0 and engaging with the driving gear 17. The second-speed gear train G2 comprises a driving gear 19 connectible to the input shaft 5 through a second-speed clutch C2, and a driven gear 20 secured to the output shaft 6 and engaging with the driving gear 19, while the third-speed gear train G3 comprises a driving gear 21 secured to the input shaft 5, and a driven gear 22 connectible to the output shaft 6 through a third-speed clutch C3 and engaging with the driving gear 21. The fourth-speed gear train G4 comprises a driving gear 23 connectible to the input shaft 5 through a fourth-speed clutch C4, and a driven gear 24 connectible to the output shaft 6 through a selector clutch Cs and engaging with the driving gear 23. On the other hand, the reverse gear train Gr comprises a driving gear 25 formed integrally with the driving gear 23 of the fourth-speed gear train G4, a driven gear 27 connectible to the output shaft 6 through the selector clutch Cs, and an idle gear 26 engaging with the gears 25, 27. The selector clutch Cs is arranged between the driven gears 24 and 27, and has a selector sleeve S which is shiftable between a left or forward position and a right or reverse position as viewed in FIG. 1, to selectively connect the driven gear 24 or 27 to the output shaft 6. The one-way clutch C0 permits the driving torque from the engine E alone to be transmitted to the driving wheels W, W', while prohibiting transmission of torque from the driving wheels W, W' to the engine E.

If the first-speed clutch C1 alone is engaged while the selector sleeve S is held in the forward position as illustrated in FIG. 1, the driving gear 17 is connected to the input shaft 5 to establish the first-speed gear train G1, thereby allowing transmission of torque from the input shaft 5 to the output shaft 6 therethrough. Then, if the second-speed clutch C2 is engaged with the first-speed clutch C1 maintained in its engaged state, the driving gear 19 is connected to the input shaft 5 to establish the second-speed gear train G2 through which torque can be transmitted from the input shaft 5 to the output shaft 6. That is, even while the first-speed clutch C1 is engaged, the second-speed gear train G2, the third-speed gear train G3 or the fourth-speed gear train G4 can be established by the action of the one-way clutch C0, rendering the first-speed gear train G1 substantially inoperative. If the second-speed clutch C2 is disengaged and the third-speed clutch C3 is engaged instead, the driven gear 22 is connected to the output shaft 6 to establish the third-speed gear train G3, while if the third-speed clutch C3 is disengaged and the fourth-speed clutch C4 is engaged instead, the driving gear 23 is connected to the input shaft 5 to thereby establish the fourth-speed gear train G4. On the other hand, if the fourth-speed clutch C4 alone is engaged while the selector sleeve S of the selector clutch Cs is shifted to the right or reverse position, the driving gear 25 and the driven gear 27 are connected, respectively, to the input shaft 5 and the output shaft 6 to establish the reverse gear train Gr, thereby allowing transmission of torque from the input shaft 5 to the output shaft 6 through the reverse gear train Gr.

The torque transmitted to the output shaft 6 is then transmitted through an output gear 28 mounted on one end of the output shaft 6 to an enlarged gear Dg of the differential Df.

Referring now to FIG. 2 illustrating a creep-inhibiting device according to a first embodiment of the invention, the oil hydraulic pump P sucks operating oil from an oil tank R for pressure delivery of same to fluid lines 29 and 94. The pressurized oil from the pump P has its pressure regulated to a predetermined value (hereinafter called "the line pressure P1") by the regulator valve Vr, and is then delivered to a manual shift valve Vm, a throttle opening-responsive valve Vt, and a governor valve Vg.

Having been regulated to a predetermined pressure value by the regulator valve Vr, the pressurized oil is delivered in part to the interior of the torque converter T through an inlet fluid line 34 provided with a restriction 33, to increase the internal pressure of the torque converter T for prevention of cavitation therein.

If the present creep-inhibiting device is to be applied to a gasoline engine, the throttle opening-responsive valve Vt generates as a parameter representative of the output of the engine E a throttle pressure Pt corresponding to the stepping amount of an accelerator pedal, not shown, of the engine E, i.e. the valve opening of a throttle valve, not shown, arranged in the intake system of the engine E, and supplies same to a pilot fluid line 48. On the other hand, the governor valve Vg is rotatively driven by the output shaft 6 of the auxiliary transmission M or the enlarged gear Dg of the differential Df, to generate a governor pressure Pg variable in response to the vehicle speed and supply same to a pilot fluid line 49.

The manual shift valve Vm is arranged between a fluid line 39 branching off from the fluid line 94 and a fluid line 40, and shiftable between a neutral position, drive range positions such as D3 and D4 positions, and a reverse position. When the manual shift valve Vm assumes one of the drive range positions, the fluid lines 39, 40 become communicated with each other, while when the manual shift valve Vm is in the neutral position or the reverse position, the fluid line 40 is communicated with a drain line 39' to drain the pressurized oil in the fluid line 40 to the oil tank R. A fluid line 41 branches off from the fluid line 40 and has a creep-inhibiting valve 50 arranged therein, hereinafter referred to, and it is connected to a hydraulically operating portion of the first-speed clutch C1 as a frictionally engaging element for starting of the vehicle. The pressurized oil in the fluid line 40 is supplied not only to the first-speed clutch C1 via the creep-inhibiting valve 50, but also to hydraulically operating portions of the second-speed, third-speed and fourth-speed clutches C2, C3 and C4 in a selective manner depending upon the switching actions of a 1-2 shift valve V1, a 2-3 shift valve V2, and a 3-4 shift valve V3, as hereinafter described.

The shift valves V1–V3 each have a spool having one end face acted upon by the combined force of the throttle pressure Pt and a spring, not shown, and the other end by the governor pressure Pg, respectively, and are adapted to shift from a right or first position to a left or second position when the governor pressure Pg exceeds the combined force of the throttle pressure Pt and the spring with an increase in the the governor pressure Pg, i.e. an increase in the vehicle speed. The forces of the springs of the shift valves V1–V3 are set at respective different values. To be specific, the 1-2 shift valve V1, which is arranged between the fluid line 40 and a fluid line 42 provided with a restriction 43, is adapted to assume the first position as illustrated when the vehicle speed is low, to thereby disconnect the fluid line 42 from the fluid line 40. With the 1-2 shift valve V1 held in this position, the first-speed clutch C1 alone is engageable to establish the first-speed reduction ratio, so long as the creep-inhibiting valve 50 is open.

As the vehicle speed increases, the 1-2 shift valve V1 is shifted to the left or second position to communicate the fluid lines 40, 42 with each other. On this occasion, the 2-3 shift valve V2 is in the first position as illustrated, to communicate the fluid line 42 with a fluid line 44 connected to the hydraulically operating portion of the second-speed clutch C2. Although both the first-speed and second-speed clutches C1 and C2 are engaged on this occasion, the second-speed gear train G2 alone is established to provide the second-speed reduction ratio, while the first-speed gear train G1 is rendered substantially inoperative with the first-speed clutch C1 maintained in an engaged state, by the action of the one-way clutch C0 in FIG. 1. Likewise, when the third-speed or fourth-speed clutch C3, C4 is engaged, the third-speed or fourth-speed gear train G3, G4 alone is established while the first-speed gear train G1 is rendered substantially inoperative with the first-speed clutch C1 maintained in an engaged state.

When the vehicle speed further increases, the 2-3 shift valve V2 is shifted to the left or second position to communicate the fluid line 42 with a fluid line 45. On this occasion, the 3-4 shift valve V3 still assumes the right or first position as illustrated, to communicate the fluid line 45 with a fluid line 46 connected to the hydraulically operating portion of the third-speed clutch C3, whereby the third-speed clutch C3 becomes engaged to establish the third-speed reduction ratio.

The 3-4 shift valve V3 is shifted to the left or second position with a further increase in the vehicle speed, and the fluid line 45 is communicated with a fluid line 47 connected to the hydraulically operating portion of the fourth-speed clutch C4 so that the fourth-speed clutch C4 becomes engaged to establish the fourth-speed reduction ratio. The arrangement of the automatic transmission described above is known in the art.

The creep-inhibiting valve 50, which is arranged in the fluid line 41, has an inlet port 51 connected via the fluid line 41 to the fluid line 40, and an outlet port 52 connected to the hydraulically operating portion of the first-speed clutch C1. A spool 55 of the valve 50 has one end face 55a formed larger in diameter than its other end face 55b, and the pressure-receiving area of the former is larger than that of the latter. The end face 55a of the spool 55 has a central portion thereof formed with a large-sized hole 56 and a small-sized hole 57 smaller in diameter than the hole 56 and arranged adjacent thereto, while the other end face 55b has its central portion formed with a hole 58. An annular groove 59 is formed in the outer peripheral surface of the spool 55, and disposed to communicate the inlet port 51 with the outlet port 52 when the spool 55 assumes a first position as illustrated. The annular groove 59 communicates with the holes 57 and 58, respectively, via small holes (hereinafter called "the restrictions") 60 and 61. A one-way valve 62 is arranged in the hole 57 to allow the pressurized oil to flow in a sole direction from the hole 57 to the hole 56.

A pressure chamber 65 is defined between the end face 55a of the spool 55 and an opposed end face of an end block 63, and a through hole (hereinafter called "the port") 63a is formed in the end block 63 and opens into the pressure chamber 65. A spring 64 is arranged in the hole 56 of the spool 55 and urges at its one end the end face of the hole 56 and at its other end the opposed end face of the end block 63, respectively. The ports 51, 52 are disposed to be communicated with each other via a fluid line 67 arranged in parallel with the creep-inhibiting valve 50 and provided therein with a one-way valve 68 which allows the pressurized oil to flow in a sole direction from the outlet port 52 to the inlet port 51. The fluid line 67 and the one-way valve 68 act to return the pressurized oil in the first-speed clutch C1 to a zone under a lower pressure when the manual shift valve Vm is shifted from the forward position to the neutral position or to the reverse position, to promptly decrease the internal pressure of the clutch C1 for prompt interruption of the engagement of same. This arrangement is particularly advantageous when the viscosity of the operating oil is low, such as in cold weather.

An electromagnetic valve 70 is mounted on an end of the creep-inhibiting valve 50 closer to the end block 63. A valve body 71 of the valve 70 is disposed to be displaced by the urging force of a spring 72 to close the port 63a when a solenoid 73 is deenergized, and be attracted against the force of the spring 72 to open the port 63a when the solenoid 73 is energized, to thereby communicate the pressure chamber 65 with a port 53. The electromagnetic valve 70 is formed of a poppet valve in which the valve body 71 is urged by the spring 72 to close the port 63a, and the force of the spring 72 and the diameter d of the port 63a are set at respective appropriate values so that when the solenoid 73 is deenergized, the pressure in the pressure chamber 65 is maintained at a predetermined pressure hereinafter referred to. By thus setting the spring force and the port diameter, even when the solenoid 73 is deenergized, the electromagnetic valve 70 can open when the pressure in the pressure chamber 65 exceeds the predetermined pressure value, to a degree corresponding to the difference between the predetermined pressure and the pressure in the pressure chamber 65, thereby communicating the pressure chamber 65 with the port 53 through the port 63a. The pressure chamber 65 can communicate with the port 53 also through a bypass fluid line 54 in which a one-way valve 66 is arranged to allow the pressurized oil to flow in a sole direction from the port 53 to the pressure chamber 65.

A pilot fluid line 90 branches off from the pilot fluid line 48 and is connected to a port 75a of a selector valve 75 hereinafter referred to, via a shut off valve 74 provided on the manual shift valve Vm and disposed to open when the manual shift valve Vm is in one of the drive range positions. The selector valve 75 has a port 75b connected to the port 53 of the creep-inhibiting valve 50 via a pilot fluid line 91. Another pilot fluid line 92 branches off from the pilot fluid line 48 and is connected to the pilot fluid line 91 extending between the port 53 and the selector valve 75. A one-way valve 82 is arranged in the pilot fluid line 92 to allow the pressurized oil to flow in a sole direction from the pilot fluid line 48 to the one-way valve 82. The selector valve 75 has a spool 76, a pressure chamber 78 defined in part by a left end face of the spool 76 as viewed in FIG. 2, and a spring 77 urging the spool 76 toward the pressure chamber 78. The pressure chamber 78 is disposed to be communicated with the pilot fluid line 90 via a one-way valve 79 which allows the pressurized oil to flow in a sole direction from the pilot fluid line 90 to the pressure chamber 78, and also communicated with the pilot fluid line 92 through a restriction 80.

An annular groove 76a is formed in the outer peripheral surface of the spool 76 of the selector valve 75, which is disposed to communicate the ports 75a, 75b with each other when the spool 76 is in a first position as illustrated. The spool 76 is urged by the force of the spring 77 toward the first position. When the pressure in the pressure chamber 78 exceeds a reference pressure Ps determined by the force of the spring 77, the spool 76 is displaced rightward as viewed in FIG. 2, into a second position to disconnect the ports 75a, 75b from each other, thereby closing the selector valve 75 to block the communication between the pilot fluid lines 90, 91.

The selector valve 75 has a shift-retarding function exhibited when it shifts from a closed position to an open position, which is imparted by the one-way valve 79 and the restriction 80. More specifically, when the throttle pressure Pt increases, it is introduced into the pressure chamber 78 through both the one-way valve 79 and the restriction 80, whereby the selector valve 75 is promptly closed without delay to disconnect the pilot fluid line 90 from the pilot fluid line 91. On the other hand, when the throttle pressure Pt decreases, the pressurized oil in the pressure chamber 78 flows out solely through the restriction 80, at a lower flow rate. Consequently, after the throttle pressure Pt has dropped below the reference pressure Ps due to sudden closing of the throttle valve, the selector valve 75 temporarily remains in a closed state, thus achieving the shift-retarding function. As noted above, the one-way valve 79, the restriction 80 and the selector valve 75 cooperate to function as a retarding valve 81, and the one-way valve 79 and the restriction 80 are formed integrally with the selector valve 75.

According to this arrangement, the creep-inhibiting valve 50 and the selector valve 75 are connected with each other via the single pilot fluid line 91 alone. Therefore, the selector valve 75 and the creep-inhibiting valve 50 which is provided with a solenoid and an adjusting mechanism can individually be arranged at different places, for instance, in the interior of the transmission and on the outer peripheral surface of same, respectively, simplifying the construction of the whole creep-inhibiting device.

A brake sensor 100 is provided for determining whether or not a brake pedal, not shown, of the vehicle is stepped on, and it generates a signal having a high level when the brake pedal is stepped on. For instance, a switch for turning on and off the stop lamps may be used as the brake sensor 100.

An engine rotational speed sensor 101 is provided, which detects the engine speed Ne by counting the interval of time between adjacent pulses of an ignititon signal for instance, and generates a signal having a high level when the detected engine speed Ne is lower then a predetermined speed Ns which is slightly higher than a reference speed, e.g. an idling speed.

The brake sensor 100 and the engine speed sensor 101 are connected to respective input terminals of an AND circuit 103 of a solenoid driving circuit 102. The AND circuit 103 has its output terminal connected to the base of a transistor Tr which has its emitter grounded and is connected at its collector to one end of the solenoid 73 of the electromagnetic valve 70 via a line 104. The other end of the solenoid 73 is connected via a line 105 to a predetermined power supply source, not shown.

The operation of the creep-inhibiting valve 50 and the retarding valve 81 will now be described.

While the vehicle is running, the output signals of the brake sensor 100 and the engine speed sensor 101 have a low level to keep the transistor Tr off to deenergize the solenoid 73 of the electromagnetic valve 70. On this occasion, an oil pressure or throttle pressure Pt corresponding to the stepping amount of the accelerator pedal, not shown, is supplied to the pilot fluid lines 90, 92. When the throttle pressure Pt is higher than the reference pressure Ps, the retarding valve 81 is closed with its spool 76 displaced rightward as viewed in FIG. 2, to disconnect the pilot fluid line 91 from the pilot fluid line 90. Consequently, the throttle pressure Pt can then be freely supplied to the pressure chamber 65 of the creep-inhibiting valve 50 through the pilot fluid line 92, the one-way valve 82 and the pilot fluid line 91, but the pressurized oil in the pressure chamber 65 finds no way for flowing out of same. On this occasion, the line pressure Pl in the fluid line 41 has been supplied in part through the restrictions 60, 61 of the creep-inhibiting valve 50 to the opposite end faces 55a, 55b of the spool 55. Therefore, the spool 55 is displaced downward into the first position as illustrated due to the difference in pressure-receiving area between the end faces 55a and 55b as well as due to the force of the spring 64, thereby communicating the port 51 with the port 52 through the annular groove 59. Consequently, the line pressure Pl is supplied through the valve 50 to the hydraulically operating portion of the first-speed clutch C1 to positively engage same.

If the accelerator pedal is released from the stepped-on state and at the same time the brake pedal is stepped on so as to stop the vehicle, the throttle pressure Pt decreases with a decrease in the stepping amount of the accelerator pedal. However, the retarding valve 81 temporarily remains in a closed state due to its shift-retarding function, thereby avoiding shocks caused upon abrupt release of the accelerator pedal. When the engine speed Ne drops below the reference speed Ns, the output of the engine speed sensor Ne is inverted to a high level. On this occasion, the output of the brake sensor 100 has already been inverted to a high level since the brake pedal was stepped on. Therefore, the AND circuit 103 generates a signal having a high level to hold the transistor Tr in a conducted or on state, whereby the electromagnetic valve 70 is energized to open the port 63a.

By this time, the retarding valve 81 has been shifted to the first position as illustrated to communicate the pilot fluid line 91 with the pilot fluid line 90, whereby the pressurized oil in the pressure chamber 65 of the creep-inhibiting valve 50 escapes to the lower pressure zone through the port 63a then opened, and the pilot fluid lines 91, 92 to decrease the pressure in the pressure chamber 65. Consequently, the spool 55 is displaced in the direction of disconnecting the ports 51, 52 from each other, i.e. upward as viewed in FIG. 2, by the oil pressure acting upon the end face 55b of the spool 55, to communicate the port 52 with a drain port 69 connected to the oil tank R, thereby decreasing the oil pressure in the fluid line 41 at the port 52, i.e. the oil pressure (clutch pressure) supplied to the hydraulically operating portion of the first-speed clutch C1. The force acting upon the spool 55 to lift same upward as viewed in FIG. 2, i.e. the clutch pressure then applied to the first-speed clutch C1, is controlled to a pressure Po determined by the force of the spring 64. The pressure Po is set at a value almost equal to and slightly smaller than an engaging pressure Pe above which the first-speed clutch C1 is engaged to cause creeping of the vehicle and which is determined by the force of a return spring, not shown, provided in the first-speed clutch C1. Therefore, the first-speed clutch C1 is maintained in a completely disengaged state, preventing creeping of the vehicle when the vehicle stands.

Then, if the brake pedal is restored to its initial position to start the vehicle, the output of the brake sensor 100 is inverted to the low level. Accordingly, the output of the AND circuit 103 goes low to turn the transistor Tr off, whereby the electromagnetic valve 70 is deenergized to allow its valve body 71 to be displaced by the force of the spring 72 to close the port 63a. If, on this occasion, the accelerator pedal is not stepped on, the valve body 71 starts to be displaced upward by the oil pressure present in the pressure chamber 65 when the same oil pressure becomes higher than the set pressure Po by a predetermined pressure $\Delta P$, so that the oil pressure in the pressure chamber 65 is escaped to the lower pressure zone through the port 63a, the pilot fluid line 91, the retarding vlave 81 then opened, and the pilot fluid line 90, thereby controlling the oil pressure in the chamber 65 to a predetermined pressure $Po + \Delta P$. This means that the force of the spring 64 of the creep-inhibiting valve 50 is substantially increased by a value corresponding to the predetermined pressure $\Delta P$, and accordingly the internal pressure of the first-speed clutch C1 acting upon its hydraulically operating portion is increased from the set pressure Po to the predetermined pressure $Po + \Delta P$. By virtue of this increase in the oil pressure by the predetermined pressure $\Delta P$, there can occur no ineffective stroke of the hydraulically operating portion of the first-speed clutch C1. This predetermined pressure $\Delta P$ may be small. By thus removing the ineffective stroke, the clutch C1 can positively be kept in a state wherein creeping of the vehicle can take place. Further, a shock caused upon restoring action of the brake pedal can be reduced to a minimum level due to the small pressure difference $\Delta P$. The clutch pressure P then present in the first-speed clutch C1 is indicated by the chain line I in FIG. 3. In the same figure, the broken line represents the engaging pressure Pe at which the force of the return spring for returning a piston of the hydraulically operating portion of the first-speed clutch C1 is equilibrated with the internal pressure of the clutch C1. As stated before, when the internal pressure of the clutch C1 is higher than the engaging pressure Pe, the vehicle is allowed to creep, while when the former is smaller than the latter, the vehicle will not creep.

If the accelerator pedal is then stepped on, a throttle pressure Pt corresponding to the stepping amount of the accelerator pedal is supplied to the fluid line 91 through the pilot fluid line 90 and the retarding valve 81 as well as through the pilot fluid line 92 and the one-way valve 82, and then to the pressure chamber 65 of the creep-inhibiting valve 50 via the one-way valve 66, whereby the spool 55 is urged downward as viewed in FIG. 2. When the throttle pressure Pt is smaller than the reference pressure Ps and accordingly the retarding valve 81 is in an open state, the spool 55 is displaced downward with an increase in the throttle pressure Pt, so that the outlet port 52 is disconnected from the drain port 69 and communicates with the inlet port 51 alone. Accordingly, the clutch pressure P of the first-speed clutch C1 gradually increases as indicated by the solid line II in FIG. 3. The creep-inhibiting valve 50 is usually shifted to the creep-permitting position with such increase in the throttle pressure Pt.

Figure 3:
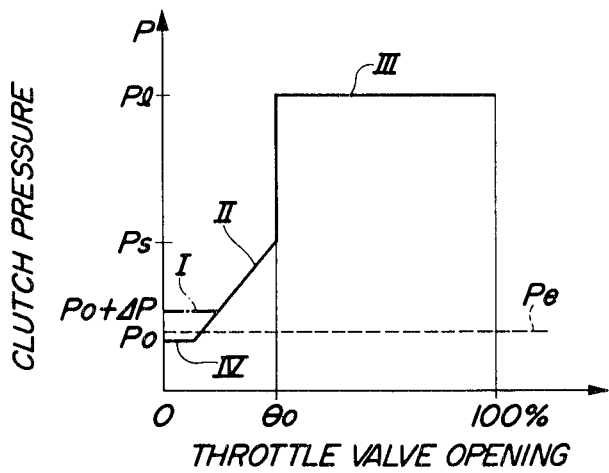
FIG. 3 is a graph showing an operating oil pressure characteristic of the creep-inhibiting device appearing in FIG. 2.

When the throttle valve opening is increased above a predetermined opening $\theta o$ so that the throttle pressure Pt exceeds the reference pressure Ps, as shown in FIG. 3, the retarding valve 81 closes to disconnect the pilot fluid line 91 from the pilot fluid line 90. Therefore, the pressures acting upon the opposite end faces 55a, 55b of the spool 55 of the creep-inhibiting valve 50 become equal to each other, whereby the spool 55 is displaced downward into the first position due to the difference in pressure-receiving area between the end faces 55a and 55b, and the urging force of the spring 64, thereby fully communicating the port 52 with the port 51. Accordingly, the line pressure P1 in the fluid line 41 is supplied to the hydraulically operating portion of the first-speed clutch C1 to increase the clutch pressure P to a level equal to the line pressure P1, as indicated by the solid line III in FIG. 3, thereby increasing the torque transmission capacity of the first-speed clutch C1 to a maximum level to ensure positive engagement of the clutch C1.

When the brake pedal is maintained in a stepped-on state, the electromagnetic valve 70 remains in an open position so long as the engine speed Ne is lower than the predetermined speed Ns. Therefore, the clutch pressure P is then maintained at the pressure Po as indicated by the solid line IV in FIG. 3. If on this occasion the accelerator pedal is stepped on, the clutch pressure P is then varied as indicated by the solid line II, as the accelerator pedal is further stepped on to supply the increased oil pressure Pt from the pilot fluid line 91 to the pressure chamber 65 via the port 63a and the one-way valve 66.

The retarding valve 81 performs the shift-retarding function only when it is opened, as stated before. Therefore, when the shift lever is shifted to the drive range (D4) position for instance, from the neutral (N) position wherein the throttle valve is normally closed and accordingly the throttle pressure Pt is zero, the retarding valve 81 is then in an open state so that the spool 55 of the creep-inhibiting valve 50 is promptly biased to block the fluid line 41 extending between the first-speed clutch C1 and the operating oil source, to thereby prevent the clutch C1 from becoming suddenly engaged, avoiding the gear shifting shock.

Incidentally, if the shut off valve 74 arranged in the pilot fluid line 90 is constructed such that it opens only when the shift lever is in the drive range (D4) position and closes when the shift lever is in a position other than the drive range (D4) position, the creeping of the vehicle can be prevented only when the shift lever is in the drive range (D4) position.

Although in the foregoing embodiments, creeping of the vehicle is inhibited by blocking the communication between the first-speed clutch C1 and the operating oil source by means of the creep-inhibiting valve, the creep-inhibiting valve according to the invention may alternatively be applied to an arrangement in which the pressurized oil to be supplied to the hydraulically operating portion of the first-speed clutch C1 can be drained to the oil tank to inhibit creeping of the vehicle.

What is claimed is:

1. In a creep-inhibiting device for use in an automotive vehicle equipped with an engine, a fluid coupling, a transmission mechanism coupled in series to said fluid coupling and having a frictionally engaging element, and an operating fluid source for supplying an operating fluid to said frictionally engaging element, said device including engine load sensor means for producing a signal fluid having a pressure representative of load applied on said engine, control means interposed between said frictionally engaging element and said operating fluid source, and a fluid line for delivering said signal fluid from said engine load sensor means to said control means, wherein said control means is adapted to control the power transmission capacity of said frictionally engaging element within a range from substantially zero to a predetermined value in dependence on the pressure of said signal fluid supplied thereto, to inhibit creeping of said vehicle when said engine is in a no-load state, the improvement comprising selector valve means arranged in said fluid line, said selector valve means being adapted to assume a first position wherein it allows said signal fluid to flow in both directions from said engine load sensor means to said control means and vice versa when the pressure of said signal fluid is lower than a predetermined value, and to assume a second position wherein it allows said signal fluid to flow in a sole direction from said engine load sensor means to said control means when the pressure of said signal fluid is higher than said predetermined value.

2. A creep-inhibiting device as claimed in claim 1, wherein said selector valve means includes restriction means for reducing the speed of a shifting motion thereof from said second position to said first position, which takes place when the pressure of said signal fluid decreases, to a value lower than the speed of a shifting motion thereof from said second position to said first position, which takes place when the pressure of said signal fluid increases.

3. A creep-inhibiting device as claimed in claim 1, wherein said control means comprises an input fluid line connected to said operating fluid source, an output fluid line connected to said frictionally engaging element, a valve body disposed to selectively connect and disconnect said input fluid line to and from said output fluid line and having first and second end faces, a first pressure chamber defined in part by said first end face of said valve body and disposed to be supplied with an operating fluid pressure in said output fluid line, a second pressure chamber defined in part by said second end face of said valve body and disposed to be supplied with the pressure of said signal fluid, a third fluid line having a restriction and disposed to always deliver said operating fluid pressure in said output fluid line to said second pressure chamber, resilient means urging said valve body in a direction of connecting said input fluid line to said output fluid line, and a drain line disposed to escape said operating fluid pressure in said output fluid line to a zone under a lower pressure when said valve body is biased in a direction of disconnecting said input fluid line from said output fluid line due to a difference in fluid pressure between said first pressure chamber and said second pressure chamber, by an amount corresponding to the amount by which said valve body is biased.

4. A creep-inhibiting device as claimed in claim 3, wherein said third fluid line is formed in said valve body.

5. A creep-inhibiting device as claimed in claim 3, further including a first one-way valve arranged in the first-mentioned fluid line extending between said control means and said selector valve means, and disposed to allow the fluid to flow in a sole direction from said selector valve means to said control means, and a second one-way valve arranged in the first-mentioned fluid line in parallel with said first one-way valve and disposed to allow the fluid to flow in a sole direction from said control means to said selector valve means, and wherein said second one-way valve is adapted to open when the pressure of fluid upstream thereof is higher than the pressure of fluid downstream thereof by an amount exceeding a predetermined value.

6. A creep-inhibiting device as claimed in claim 5, wherein said vehicle has a braking device, and said second one-way valve comprises an electromagnetic valve, said creep-inhibiting device further including brake sensor means for detecting whether or not said braking device is operative, and a driving circuit adapted to open said electromagnetic valve when said braking device is detected to be operative by said brake sensor means, whereby the power transmission capacity of said frictionally engaging element is set to different values in dependence on whether said braking device is operative or inoperative.

7. A creep-inhibiting device as claimed in claim 1, wherein said control means further includes a bypass fluid line bypassing said control means and connecting said frictionally engaging element to said operating fluid source, and a one-way valve arranged in said bypass fluid line and disposed to allow the fluid to flow in a sole direction from said frictionally engaging element to said operating fluid source.

* * * * *